Nov. 28, 1950 R. D. DODGE ET AL 2,531,875

TAPE FEEDING MECHANISM FOR TYPEWRITING MACHINES

Filed Oct. 16, 1946 2 Sheets-Sheet 1

INVENTORS
J.L. PETZ
R.D. DODGE
BY
ATTORNEY

Nov. 28, 1950 R. D. DODGE ET AL 2,531,875

TAPE FEEDING MECHANISM FOR TYPEWRITING MACHINES

Filed Oct. 16, 1946 2 Sheets-Sheet 2

INVENTORS
J. L. PETZ
R. D. DODGE
BY E. W. Lipford
ATTORNEY

Patented Nov. 28, 1950 2,531,875

UNITED STATES PATENT OFFICE 2,531,875

TAPE FEEDING MECHANISM FOR TYPEWRITING MACHINES

Ronald D. Dodge and John L. Petz, Poughkeepsie, N. Y., assignors to International Business Machines Corporation, New York, N. Y., a corporation of New York Application October 16, 1946, Serial No. 703,696

4 Claims. (Cl. 197—133)

This invention relates to typewriting machines.

The principal object of the present invention is to provide an improved tape printer suitable for use in cable, telegraph, and radio telegraph systems, either of the type in which the typewriter is automatically operated under control of a line or radio circuit or in which the typewriter is operated manually by an operator receiving code.

An object is to provide a tape printer in which the tape is fed more rapidly than is usually the case.

An object is to provide a tape printer in which the tape is fed by power.

Other objects of the invention will be pointed out in the following description and claims and illustrated in the accompanying drawings, which disclose, by way of example, the principle of the invention and the best mode, which has been contemplated, of applying that principle.

Figure 1:
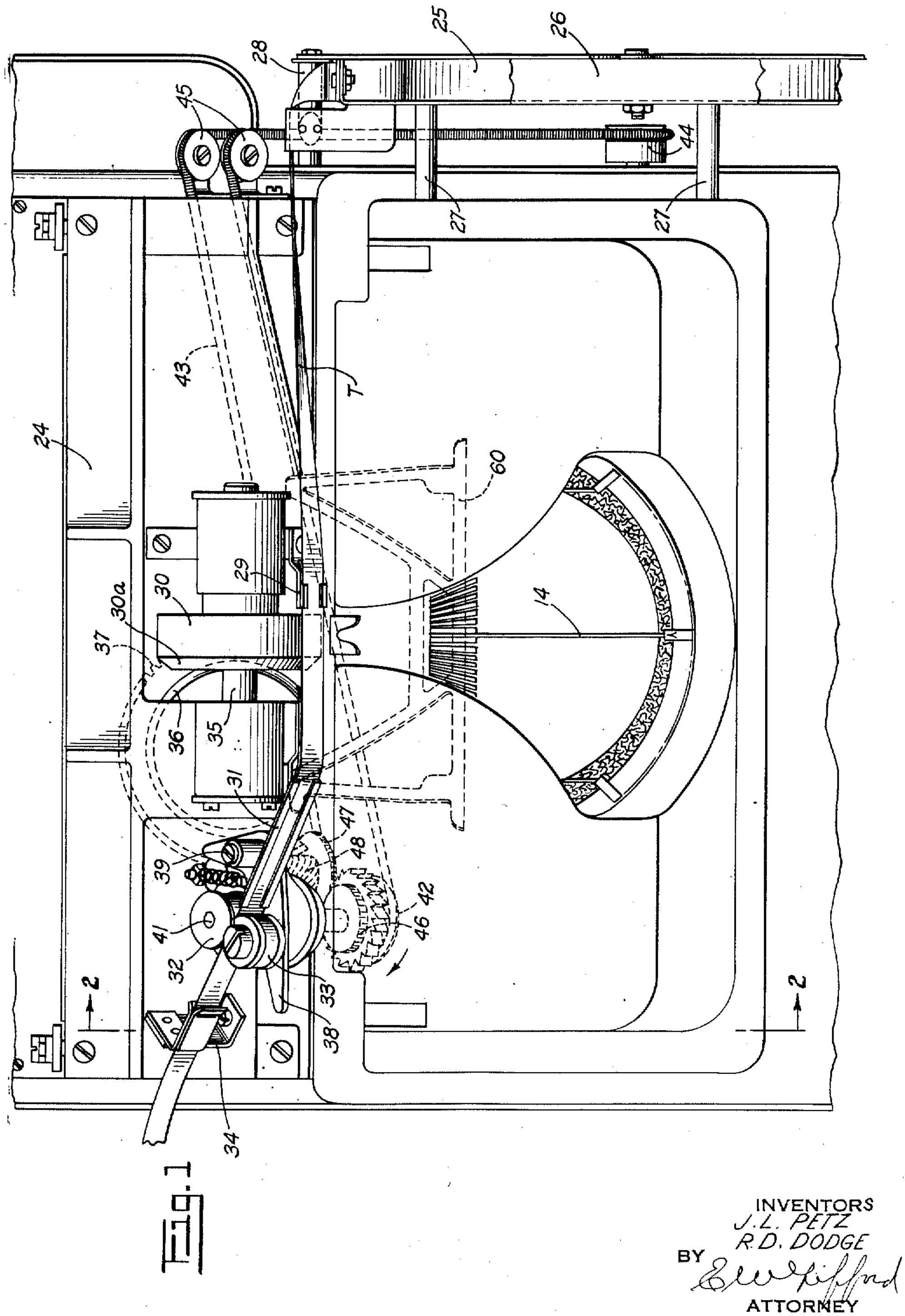
Fig. 1 is a plan view of a typewriting machine with the present invention attached thereto.

In the drawings the invention is shown as applied to the well known "Electromatic" power-operated typewriter purely for convenience of illustration and it will be understood that the invention may be applied to other forms of typewriters whether actuated by power or wholly manually operated. In the event that the mechanism is applied to a wholly manual typewriter it may be desirable to provide a separate motor for actuating the tape feeding mechanism.

Figures 2, 3, 4:
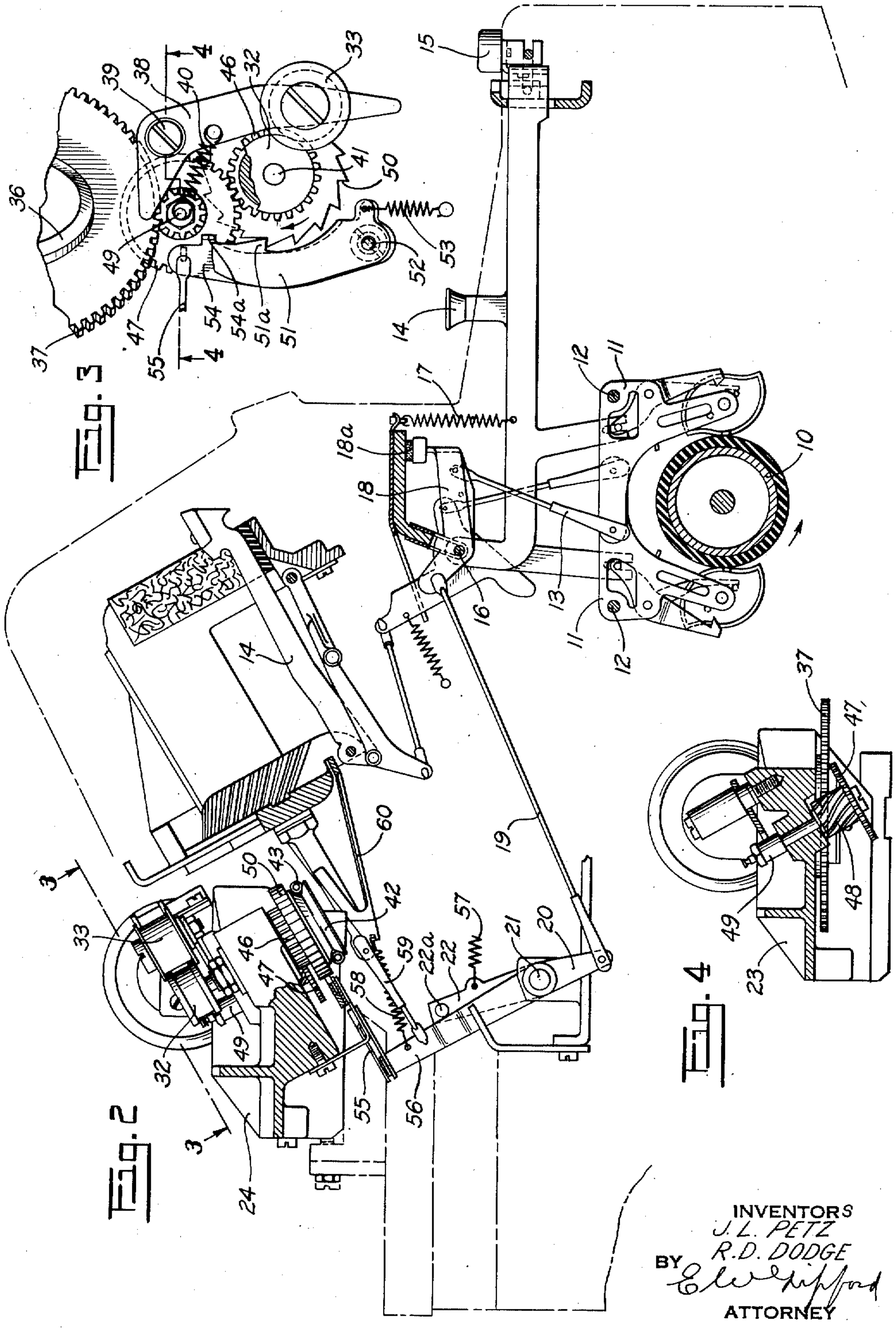
Fig 2 is a vertical section on the line 2—2 in Fig. 1.
Fig. 3 is a large scale detail view of the tape feeding mechanism as viewed on the line 3—3 in Fig. 2.
Fig. 4 is a section on the line 4—4 in Fig. 3.

Since the typewriter is now well known in the art and its mechanisms have been disclosed in numerous patents, only a very brief general description of its main features will be given here. In this typewriter the various mechanisms are operated by a power roller 10 (Fig. 2) which rotates continually in the direction of the arrow while the machine is in operation. Cooperating with the power roller 10 are the well known cam units 11 which are pivoted on the cross rods 12 and connected to the type bars 14 and other mechanisms through trains of connections which include links 13. These connections are not involved herein and therefore need not be described.

The cam units 11 are selectively rendered operable by the power roller 10 by means of the character keys 14 (Fig. 2) and the space bar 15, the keys 14 being pivoted on a cross rod 16 and restored by springs 17 in a well known way. The cam unit 11 for the space bar 15 is connected by one of the links 13 to a bail 18 pivoted on the rod 16. This bail has a link connection 19 with an arm 20 fixed to a cross shaft 21 suitably supported in the main framework. This shaft customarily carries an arm 22 near the middle of the machine which ordinarily is used to operate escapement mechanism for letter-spacing the carriage. While the functions of this arm 22 are retained in the present case to operate the tape feeding mechanism under the control of the space bar 15, the machine is not provided with a carriage but instead is provided with a frame casting 24 which supports the tape feeding mechanism.

The tape T on which the message is to be printed is taken from a roll 25 (Fig. 1) carried by a suitable reel housing 26 mounted on the right hand side of the frame and spaced therefrom by suitable studs or spacing collars 27. Mounted on a bracket attached to the housing 26 is a diagonal tape guide 28 around which the tape T passes, to the left in Fig. 1, to a tape guide 29 suitably supported on the frame 24. From the latter guide the tape passes in front of the disk platen 30 and thence to a long tape guide 31 also supported by the frame 24. From the guide 31 the tape passes between the tape feeding rollers 32, 33 and through a third tape guide 34 from which the tape is discharged loosely into a suitable receptacle, such as a basket.

The platen 30 is constructed as described in Patent No. 2,083,365 which includes a means for not only rotating the platen 30 but also a means of oscillating the platen along its axis 35. The oscillating and rotating means includes a beveled cam 36 which is driven by a gear 37, the bevel on the cam cooperating with a bevel 30*a* on the platen 30 to both rotate the platen and oscillate it on the axis 35. This rotation and oscillation of the platen is for the purpose of equalizing wear on the platen and preventing the type from pounding depressions in the platen due to constant striking of the type in one spot.

The feed roller 33 is mounted on a lever 38 (Figs. 1 and 3) which is pivoted on a stud 39 carried by the frame 24 and is urged in a clockwise direction by a spring 40 which maintains the feed roller 33 in engagement with the roller 32. The latter is secured to the upper end of a shaft 41, the axis of which is inclined (Fig. 2) at right angles to the longitudinal axes of the type bars 14. Secured to the lower end of the shaft 32 is a pulley 42 which is connected by a belt 43 (Fig. 1) to a pulley 44 secured to power roller 10, the belt 43 passing around guide pulleys 45 carried by a suitable bracket on the main framework. Since the power roller 10 rotates continually while the machine is in operation it is evident that the belt 43 will normally try to turn the pulley 42 in the direction of the arrow (Fig. 1). Preferably the belt 43 is of the type known as a spring belt consisting of a coil spring wound very closely so that the belt may be capable of slipping on the pulleys 42, 44 while the pulley 42 is held against movement.

From the foregoing it is apparent that a slipping power drive is provided which permits the pulley 42 to be held against rotation except when it is desired to feed the tape.

Secured to the shaft 41 (Figs. 1 to 4) is a gear 46 which meshes with a slightly larger gear 47 to which is fixed a helical pinion 48 rotatably mounted on a fixed stud 49 carried by the frame 24, the stud 49 extending parallel with the shaft 41 and anchoring spring 40. The pinion 48 meshes with the gear 37 and thereby the platen 30 will be rotated or "creep" a small amount whenever the feed roller 32 rotates.

Also secured to the shaft 41 is a feed ratchet 50 (Figs. 1 and 3) with which cooperates a feed dog 51 loosely pivotally mounted on a stud 52 carried by the frame 24. The feed dog has a tooth 51*a* normally engaging a tooth in the ratchet 50 to prevent the ratchet and consequently the feed roller 32 from rotating in a clockwise direction (Fig. 3), thus preventing feeding of the tape under the stimulus of the slipping belt 43. The dog 51 is held in engagement with the ratchet by means of a spring 53 anchored to an ear formed in the dog and to a fixed pin carried by the framework.

Also pivotally mounted on the stud 52 (Fig. 3) and urged in a clockwise direction by a spring similar to the spring 53 is an operating dog 54 connected by link 55 to a lever 56 (Fig. 2) loosely pivoted on the shaft 21 adjacent the arm 22. The bail 18 which is associated with the space bar 15 is provided with a bumper 18*a* which is normally held in contact with a part of the framework by a spring 57 connected to the arm 22 and urging said arm in a clockwise direction. The arm 22 has a pin 22*a* against which the arm 56 is held by a spring 58. The arm 56 is also connected by a link 59 to the usual universal bar 60 which is actuated by the type bars 14 in a well known way each time a character is printed. It is apparent that the arm 56 may be operated either by the space bar cam unit which is controlled by the space bar 15 through the bail 18, link 19, and arm 22, or by the universal bar 60 through link 59. When the arm 56 is rocked counterclockwise in the manner just described the link 55*a* is drawn to the left (Figs. 2 and 3), thereby rocking the arm 54 counterclockwise. This arm has a lug 54*a* cooperating with the end of the dog 51, whereby the dog 51 will be disengaged from the ratchet.

Because of the fact that the type bars 14 and other mechanisms of the machine are operated by the cam units 11, there is a fairly constant operating time involved in each cycle of operation. In other words, the actuations of the arm 56 in the two ways above mentioned will be effected at great speed but with a precision of timing which may be made very uniform. This makes it unnecessary to provide a holding dog for the ratchet 50 since the dog 51 is withdrawn and released before the ratchet 50 can rotate more than a tooth space. The spacing of the teeth in the ratchet 50 is such that the tape T will be advanced one letter space with each operation of the arm 56.

The principal advantage of the feed mechanism just described is that a very high speed of operation may be attained. This arises partly from use of the spring belt connected to the power roller as a means of rotating the ratchet and partly due to dispensing with the conventional holding dog which is usually considered necessary in an escapement device. The string belt operates the ratchet 50 with greater speed than would be possible with a conventional leather or rubber belt, owing to the greater resiliency of the spring. Between operations of the dog 51 the spring belt stretches slightly and thereby has stored therein a reserve of power over and above that contributed by the power roller which gives the ratchet 50 an extra fast impulse when the dog 51 is released.

As a result of the mechanism described above the machine may be operated much faster than an ordinary machine employing a carriage such as usually found in page printers and conventional typewriters which are notoriously slow because of the inertia of the heavy carriage which must be started in motion and stopped with each impression of the type. Thus, the machine is not only better adapted for remote control, but is also capable of much faster operation by a skilled code telegrapher than a conventional typewriter would be.

While there have been shown and described and pointed out the fundamental novel features of the invention, as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a typewriter having power-operated typing mechanism including a continually rotating member, a pair of rollers for feeding a record tape to the typing mechanism, means connected to the member and normally tending to rotate said feed rollers to feed said tape, a feed ratchet connected to one of said feed rollers, a single feed controlling dog normally engaging said ratchet to prevent rotation of the feed rollers by the connected means, and means actuated by the typing mechanism for momentarily releasing said dog each time the typing mechanism is operated.

2. In a typewriter having power type bar operating mechanism including a continually rotating member, type bars actuated thereby, means for advancing a record tape to a position to receive an imprint from the type bars including means actuated by the member tending to continually drive the advancing means, a ratchet for restraining operation of the advancing means, a feed dog normally engaging the ratchet to prevent rotation thereof, and means actuated by the type bars for momentarily releasing the feed dog each time a type bar is operated.

3. In a typewriter having type bars and a continually rotating power device for operating the type bars, means for feeding a record tape to position to receive imprints from the type bars, a slipping belt drive between said power device and feeding means continually tending to operate the feeding means, a holding ratchet for said feeding means, a holding dog normally restraining the ratchet, and a universal bar actuated by said type bars in their printing movement to momentarily release said dog.

4. In a machine of the class described, type bars, power means for operating the type bars including a continually running power roller and cam units actuated by the power roller and connected to the type bars, a pair of feed rollers coacting to feed a tape to the printing point of the type bars, a ratchet connected to one of said rollers, a single holding dog normally engaging said ratchet to restrain feeding of the tape, a slipping spring belt drive between said power roller and one of said feed rollers normally tending to turn the rollers in tape feeding direction against the restraint exercised by said ratchet and holding dog, a universal bar actuated each time a type bar is operated by the power roller, and means whereby the universal bar momentarily releases said dog to permit a single step of movement of the ratchet.

RONALD D. DODGE.
JOHN L. PETZ.

REFERENCES CITED

The following references are of record in the file of this patent:

UNITED STATES PATENTS

| Number | Name | Date |
|---|---|---|
| 1,657,422 | Van Beek | Jan. 24, 1928 |
| 2,024,211 | Eitzen | Dec. 17, 1935 |
| 2,083,365 | Dodge | June 8, 1937 |
| 2,308,563 | Maus et al. | Jan. 19, 1943 |